Jan. 14, 1941.  J. F. COLEMAN  2,228,442
METHOD OF AND MACHINE FOR SKIVING
Filed Nov. 21, 1939   2 Sheets-Sheet 1
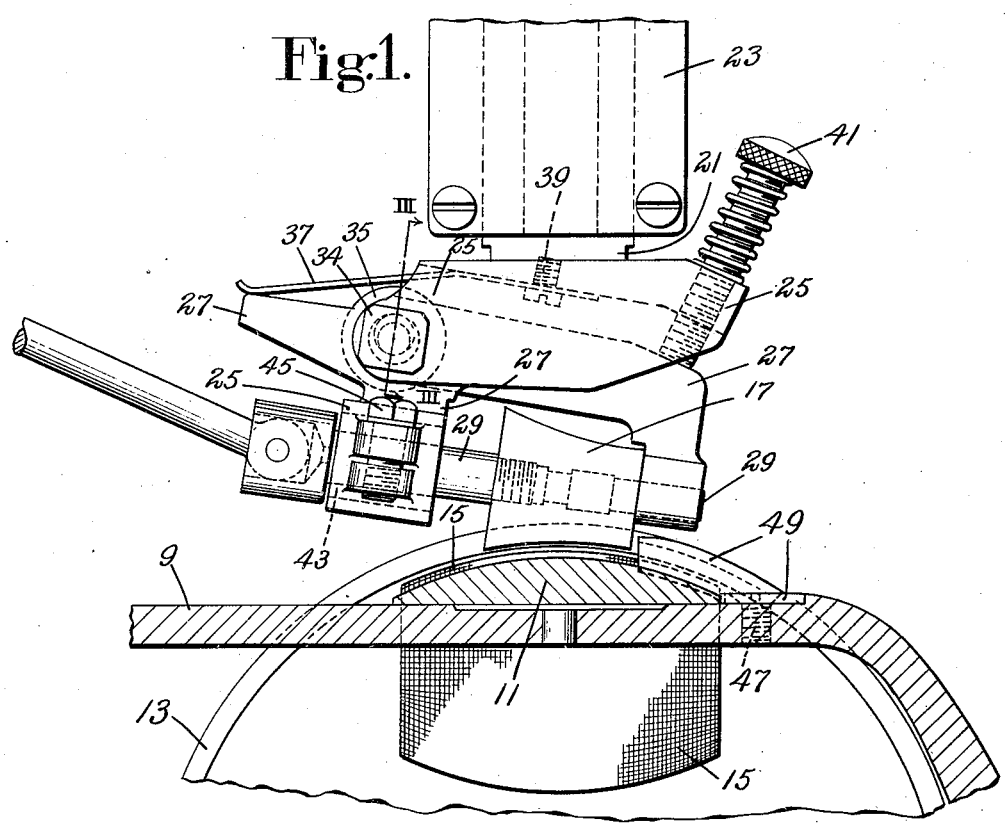
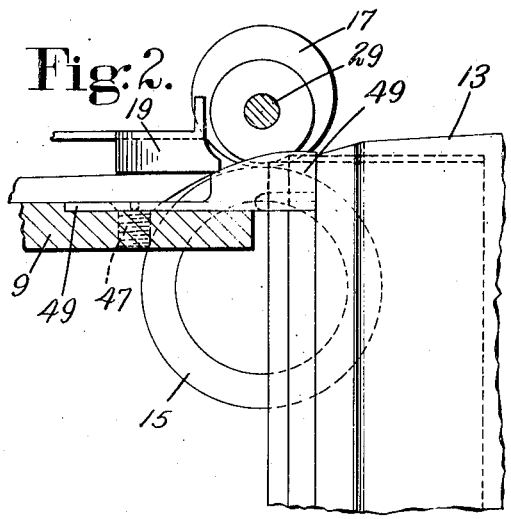
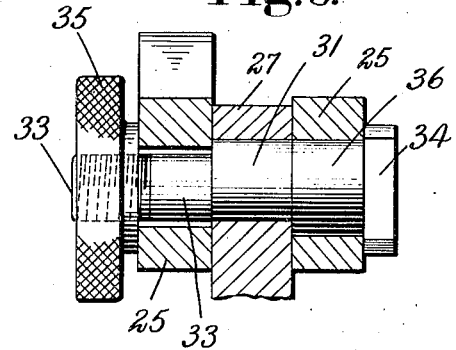
INVENTOR
Joseph F. Coleman
By his Attorney
Victor Coll Jan. 14, 1941. J. F. COLEMAN 2,228,442
METHOD OF AND MACHINE FOR SKIVING
Filed Nov. 21, 1939 2 Sheets-Sheet 2

INVENTOR
Joseph F. Coleman
By his Attorney
Victor Cobb

Patented Jan. 14, 1941

2,228,442

UNITED STATES PATENT OFFICE 2,228,442

METHOD OF AND MACHINE FOR SKIVING

Joseph F. Coleman, Braintree, Mass., assignor to United Shoe Machinery Corporation, Borough of Flemington, N. J., a corporation of New Jersey Application November 21, 1939, Serial No. 305,527

9 Claims. (Cl. 164—60)

This invention relates to a method of and a machine for skiving flexible sheet material, said method and machine being particularly suited to the removal of a marginal portion of the readily compressible layer of a piece of work which consists of a layer of thin flexible material, such as fabric, to which is attached a layer of readily compressible material, such as sponge rubber.

In the manufacture of shoes of the Goodyear welt type, after the shoe has been lasted, the welt attached and the inseam trimmed, there is a cavity in the bottom of the shoe which must be filled before the outsole is attached. It has been proposed to use for this purpose a laminated filler piece consisting of a layer of fabric, to one face of which a layer of sponge rubber is attached, the outline of the edge of the sponge rubber layer being similar to but smaller than that of the fabric layer. The shape of the filler piece is such that, when it is placed upon the bottom of the lasted shoe, the margin of the fabric layer overlies the inseam, while the sponge rubber layer lies in and substantially fills the cavity which is outlined by the inseam. Such filler pieces may be made by preparing sheets of laminated material, dieing out blanks of the proper shape and size for the fabric layer, and then removing the margin of the sponge rubber layer. Although the specific article described above is adapted for use in making shoes, articles similar to this one, is that they consist of a layer of fabric and a layer of compressible material of smaller outline than that of the fabric, are useful in other arts, for example, in upholstery where the margin of the fabric, which projects beyond the edge of the compressible material, may be bent over said edge into position to cover the edge of this material.

The purpose of the present invention is to provide a method of and a machine for removing a marginal portion of the compressible layer of a laminated article of the kind described so as to leave a marginal portion of the thin flexible layer projecting beyond the edge of the compressible layer. The method comprises bending the laminated piece in such manner that its marginal portion is held at a different level from that of its body portion, and a portion of the compressible material is compressed, and then severing the laminated piece by a cut which coincides substantially with the joint at the marginal portion between the layer of thin flexible material and the layer of readily compressible material. The machine comprises a knife, a feed roll and means cooperating with the roll for so bending the work and compressing the compressible layer as the work is presented to the knife.

Referring to the accompanying drawings,

Fig. 1 is a view, partly in end elevation and partly in cross section, of a machine by the use of which the method may be conveniently practiced;

Fig. 2 is a detail, principally in side elevation, showing the relative positions of the work-engaging members;

Fig. 3 is a section on the line III—III of Fig. 1, showing the means for adjusting the presser roll lengthwise.

Figure 4:
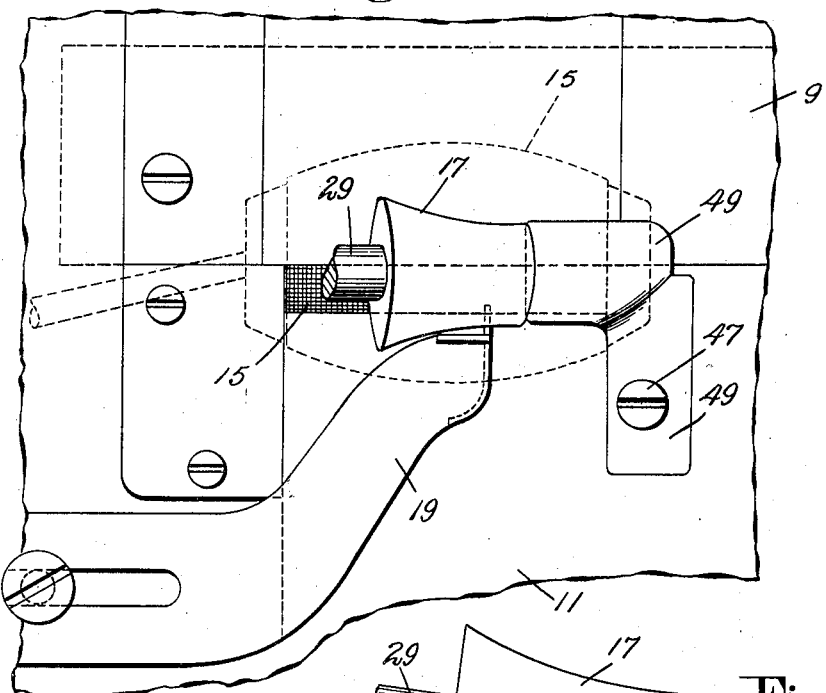
Fig. 4 is a view looking down upon the work-engaging parts of the machine.

The illustrated machine is similar in many respects to the machine shown in United States Letters Patent No. 1,469,849, granted October 29, 1923, upon an application filed in the name of Eugene J. Ray and, like the machine of the patent, comprises a hollow base 9 (Fig. 1), the upper forward portion of which carries a plate 11 over which the work is fed. A rotary cylindrical knife 13 projects up through the top of the base in position to engage the work, the work being fed to the knife by a feed roll 15, the periphery of which is convex lengthwise to correspond to the curvature of the knife and a cooperating presser roll 17. The feed roll, which is located partly within the knife, is yieldingly supported in such manner that it may yield bodily downwardly away from the adjacent edge of the knife and may also tilt about an axis which is at right angles to its axis of rotation, said roll being driven continuously as are the knife and the presser roll. A guide 19 (Figs. 4 and 5) is provided for guiding the work by engagement with its edge. The presser roll is carried by an upright bar 21 (Fig. 1) which is vertically adjustable in a vertical guideway formed in a member 23 carried by an overhanging arm of the machine. As thus far described, the machine is or may be substantially the same as that of the patent to which reference is made for further details of construction.

The presser roll and its mounting are somewhat different from those of the patented machine. Fast to, or integral with, the lower end of the vertical bar 21 is a block 25 having two downwardly extending flanges spaced apart so as to receive between them a carrier 27 for the shaft 29 of the presser roll. This carrier is mounted for angular adjustment about an enlarged eccentric portion 31 (Fig. 3) on a bolt 33. The bolt has a square head 34 and a second enlarged portion 36, which is concentric with the bolt and is rotatable in the bore in one of the flanges of the block 25. The other end of the bolt, upon which a locking nut 35 is threaded, passes through a hole in the other flange of the block, the hole being considerably larger in diameter than the diameter of the bolt. The presser roll carrier 27 may be adjusted about the axis of the eccentric portion 31 of the bolt, being constantly urged to do so by a leaf spring 37, one end of which bears upon the tail of the carrier and the other end of which is fastened by a screw 39 to the block 25 between its downwardly extending flanges. An adjusting screw 41, threaded through a portion of the block 25, provides means for adjusting the roll carrier 27 angularly. The roll carrier may also be adjusted lengthwise, that is, to the right and to the left as viewed in Fig. 1, by loosening the thumb nut 35 and turning the bolt 33 by means of its head 34. The carrier 27 is in the form of a yoke, one downwardly extending leg of which is provided with a bearing for the outer end of the presser roll shaft 29, the other end of said shaft being rotatable in a sleeve 43 which is clamped by a pinch screw 45 in a split bearing formed at the lower end of the other downwardly extending leg of the block 25. The presser roll 17 is concave lengthwise, its cavity corresponding to the curvature of the edge of the knife 13 and to the lengthwise curvature of the feed roll 15.

Figure 5:
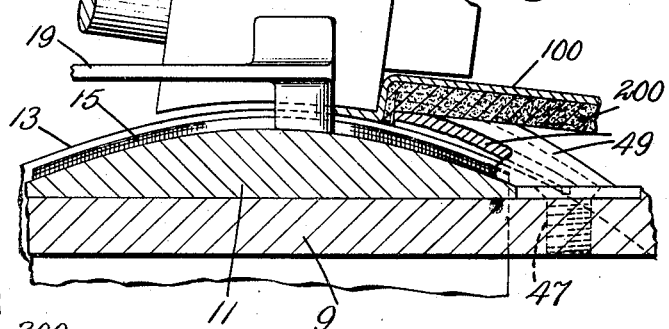
Fig. 5 is a view, partly in elevation and partly in section, showing more particularly how the work is bent and a portion of the compressible layer compressed during the cutting operation.

In order to cooperate with the presser roll and the feed roll so as to bend the work and to compress a portion of the sponge rubber layer in a manner presently to be described, there is fastened to the top of the base or frame 9 by a screw 47, a plate 49, the operative portion of which is curved to correspond generally to the curvature of the feed roll, the work supporting surface of the plate being at a level above the level of the work-engaging portion of the presser roll 17, and the adjacent ends of the plate and the presser roll being spaced apart a distance which is less than that of the thickness of the work. When it is desired to operate upon a piece of work, such as that shown in Fig. 7 which consists of a layer of fabric 100 to one face of which a layer of sponge rubber is attached, so as to produce the result shown in Fig. 8, the work is presented to the machine with the fabric side up and with its edge in contact with the guide 19. During the skiving operation, the work is held by the operator with its edge in contact with the edge guide and is swung, as may be necessary, to cause the skiving cut to follow the contour of the edge of the work. Referring now more particularly to Fig. 5, the work is bent in the manner there shown, the marginal portion of the work being forced down by the presser roll 17, and the sponge rubber of the marginal portion being compressed so that the cut of the knife coincides substantially with the joint at this marginal portion between the fabric and the sponge rubber. At the same time, the sponge rubber in the generally upstanding portion of the work, which connects the marginal portion with the body portion, is compressed between the right-hand end of the presser roll 17 and the left-hand end of the plate 49; and the lower end of this upright portion is severed at substantially right angles so that, when the work leaves the machine and the compressed portion of the sponge rubber expands, there is produced the result shown in Fig. 8.

Figure 7:
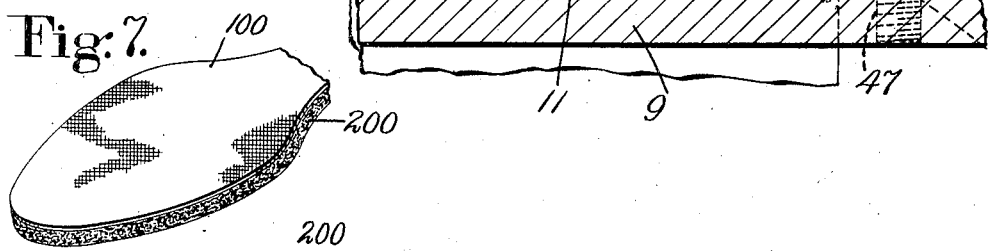
Fig. 7 is a perspective of a blank for a filler piece for a shoe before said blank has been operated upon by the machine.
Figure 8:
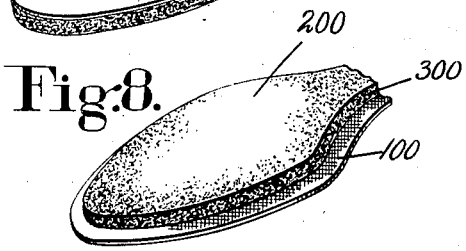
Fig. 8 is a perspective of the same filler piece blank after having been operated upon by the machine.

The distance between the end of the presser roll 17 and the adjacent end of the plate 49 is determined by adjusting the presser roll lengthwise by means of the bolt 33 with its eccentric portion 31. This distance will depend not only upon the thickness of the work, particularly the thickness of the sponge rubber layer, but also upon whether the edge 300 of the sponge rubber layer is desired to be at right angles to the plane of its surface or at some other inclination. For example, if, in operating upon the particular piece of work as shown in Fig. 7, it is desired to produce a beveled edge on the sponge rubber layer of the finished piece, the presser roll will be adjusted to the left to increase the space between the end of the roll and the end of the plate, so that the sponge rubber layer, which passes through this space, will be compressed somewhat less than is shown in Fig. 5. It is thus possible to bevel the edge of the sponge rubber at different desired inclinations.

Figure 6:
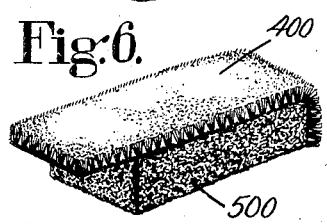
Fig. 6 is a perspective of a piece of a strip of material used in upholstery.

In Fig. 6, there is shown a section of a strip of material used in upholstery, said strip comprising a layer of heavy fabric 400, such for example as plush, and a layer of readily compressible material, such as sponge rubber 500. In this case, the projecting margins of the layer of fabric are bent down and cemented to the edges of the layer of sponge rubber, one such margin being shown in the figure as so bent and cemented. With such an article, only the plush will be exposed to view when the upholstery strip has been fastened in place on the automobile or other object to which it is applied.

Having described my invention, what I claim as new and desire to secure by Letters Patent of the United States is:

1. The method of removing a marginal portion of the readily compressible layer from a piece of work consisting of a layer of flexible material such as fabric to one face of which a layer of readily compressible material such as sponge rubber is attached, said method comprising progressively bending the work in such manner that the marginal portion is at a different level from that of the body portion, and severing the work by a cut which is substantially parallel to the marginal portion.

2. The method of removing a marginal portion of the readily compressible layer from a piece of work consisting of a layer of flexible material such as fabric to one face of which a layer of readily compressible material such as sponge rubber is attached, said method comprising progressively bending the work in such manner that the marginal portion and the body portion are at different levels and are connected by an intermediate portion, simultaneously compressing the readily compressible material in the localities of the marginal portion and the intermediate portion, and severing the work by a cut which is substantially parallel to the marginal portion.

3. The method of removing a marginal portion of the readily compressible layer from a piece of work consisting of a layer of flexible material such as fabric to one face of which a layer of readily compressible material such as sponge rubber is attached, said method comprising progressively bending the work in such manner that the marginal portion and the body portion are at different levels and are connected by an intermediate portion, simultaneously compressing the readily compressible material in the localities of the marginal portion and the intermediate portion, and severing the work by a cut which coincides substantially with the joint at the marginal portion between the flexible material and the compressible material.

4. A machine for operating upon a piece of work consisting of a layer of flexible material such as fabric to one face of which a layer of readily compressible material such as sponge rubber is attached, said machine having in combination a knife and means for feeding the work to the knife, said means acting progressively to bend the work and to compress the readily compressible material as the work is advanced to the knife in such manner that the knife severs the work by a cut which is substantially parallel to the marginal portion.

5. A machine for operating upon a piece of work consisting of a layer of flexible material such as fabric to one face of which a layer of readily compressible material such as sponge rubber is attached, said machine having in combination a knife, a feed roll, a plate for supporting the body portion of the work, and a presser for engaging the marginal portion of the work and bending the work over the adjacent end of the plate, the distance between the adjacent ends of the plate and the presser being less than the thickness of the work.

6. A machine for operating upon a piece of work consisting of a layer of flexible material such as fabric to one face of which a layer of readily compressible material such as sponge rubber is attached, said machine having in combination a knife, a feed roll, a plate for supporting the body portion of the work, and a presser for engaging the marginal portion of the work and bending the work over the adjacent end of the plate, the distance between the adjacent ends of the plate and the presser being less than the thickness of the work, said plate and presser being relatively adjustable to vary said distance.

7. A machine for operating upon a piece of work consisting of a layer of flexible material such as fabric to one face of which a layer of readily compressible material such as sponge rubber is attached, said machine having in combination a knife, a feed roll, a plate for supporting the body portion of the work, and means for adjusting the presser longitudinally toward and from the adjacent end of the plate.

8. A machine for operating upon a piece of work consisting of a layer of flexible material such as fabric to one face of which a layer of readily compressible material such as sponge rubber is attached, said machine having in combination a driven cylindrical knife, a driven feed roll located partly within the knife, a plate for supporting the body portion of the work, and a driven presser roll for engaging the marginal portion of the work and bending the work over the adjacent end of the plate, the distance between the adjacent ends of the plate and the presser roll being less than the thickness of the work.

9. A machine for operating upon a piece of work consisting of a layer of flexible material such as fabric to one face of which a layer of readily compressible material such as sponge rubber is attached, said machine having in combination a driven cylindrical knife, a driven feed roll located partly within the knife, a plate for supporting the body portion of the work, a driven presser roll for engaging the marginal portion of the work and bending the work over the adjacent end of the plate, the distance between the adjacent ends of the plate and the presser roll being less than the thickness of the work, and means whereby said distance may be varied.

JOSEPH F. COLEMAN.